US008601004B1

(12) United States Patent
Mahadevan et al.

(10) Patent No.: US 8,601,004 B1
(45) Date of Patent: Dec. 3, 2013

(54) SYSTEM AND METHOD FOR TARGETING INFORMATION ITEMS BASED ON POPULARITIES OF THE INFORMATION ITEMS

(75) Inventors: Uma Mahadevan, Cupertino, CA (US); Jacob Samuels Burnim, Pasadena, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 11/295,748

(22) Filed: Dec. 6, 2005

(51) Int. Cl.
*G06F 17/30* (2006.01)
(52) U.S. Cl.
USPC ............... 707/751; 705/14.53; 705/14.58
(58) Field of Classification Search
CPC ............ G06Q 30/02; G06F 17/30867; G06F 17/30675
USPC ............ 707/3, 101, 751, 999.101; 705/14.53, 705/14.58
See application file for complete search history.

(56) References Cited

U.S. PATENT DOCUMENTS

| | | | |
|---|---|---|---|
| 3,566,153 A | 2/1971 | Spencer, Jr. | 307/205 |
| 5,109,509 A * | 4/1992 | Katayama et al. | 704/9 |
| 5,208,748 A | 5/1993 | Flores et al. | 704/1 |
| 5,216,603 A | 6/1993 | Flores et al. | 704/1 |
| 5,613,108 A | 3/1997 | Morikawa | 707/200 |
| 5,724,521 A | 3/1998 | Dedrick | 395/226 |
| 5,724,571 A | 3/1998 | Woods | |
| 5,734,837 A | 3/1998 | Flores et al. | 705/7 |
| 5,740,549 A | 4/1998 | Reilly et al. | 705/14 |
| 5,761,689 A | 6/1998 | Rayson et al. | |
| 5,832,502 A | 11/1998 | Durham et al. | |
| 5,848,397 A | 12/1998 | Marsh et al. | 705/14 |
| 5,887,133 A | 3/1999 | Brown et al. | 395/200.3 |
| 5,905,863 A | 5/1999 | Knowles et al. | |
| 5,913,040 A | 6/1999 | Rakavy et al. | |
| 5,918,014 A | 6/1999 | Robinson | 395/200.49 |

(Continued)

FOREIGN PATENT DOCUMENTS

| | | |
|---|---|---|
| EP | 0886228 A2 | 12/1998 |
| JP | 09-128407 (A) | 5/1997 |

(Continued)

OTHER PUBLICATIONS

AdForce, Inc., A Complete Guide to AdForce, Version 2.6, 1998, Chapter 6, p. 6-20 and 6-21. (Provided by Applicant).*

(Continued)

*Primary Examiner* — Phuong Thao Cao
(74) *Attorney, Agent, or Firm* — Morgan, Lewis & Bockius LLP

(57) ABSTRACT

A method of selecting information items in connection with an electronic message includes selecting a plurality of information items satisfying a predefined popularity condition and identifying any one from the selected information items whose associated keyword is found in the electronic message. A set of candidate items are selected periodically based on their respective popularity metrics. The popularity metric of an information item may be its click-through rate during a predefined time period. Each candidate information item has one or more keywords and the number of the keywords found in the electronic message determines the item's relevancy to a user accessing the message. In some embodiments, the method selects a subset of the information items using user geographical information associated with a user accessing the electronic message from a client and at least one of the selected information items is set to target users at a location corresponding to the user geographical information.

35 Claims, 5 Drawing Sheets

(56) References Cited

U.S. PATENT DOCUMENTS

| | | | |
|---|---|---|---|
| 5,948,058 A | 9/1999 | Kudoh et al. ............... 709/206 |
| 5,948,061 A | 9/1999 | Merriman ................... 709/219 |
| 5,959,621 A | 9/1999 | Nawaz et al. |
| 5,963,205 A * | 10/1999 | Sotomayor ................. 715/236 |
| 5,987,454 A | 11/1999 | Hobbs ............................ 707/4 |
| 6,014,502 A * | 1/2000 | Moraes ....................... 709/219 |
| 6,021,427 A | 2/2000 | Spagna et al. |
| 6,026,368 A | 2/2000 | Brown et al. ................ 705/14 |
| 6,029,164 A | 2/2000 | Birrell et al. |
| 6,044,376 A | 3/2000 | Kurtzman, II ............. 707/102 |
| 6,078,914 A | 6/2000 | Redfern ........................ 707/3 |
| 6,085,206 A | 7/2000 | Domini et al. |
| 6,115,709 A | 9/2000 | Gilmour et al. ............... 707/9 |
| 6,134,532 A | 10/2000 | Lazarus et al. .............. 705/14 |
| 6,144,944 A | 11/2000 | Kurtzman, II et al. ...... 705/14 |
| 6,148,332 A | 11/2000 | Brewer et al. .............. 709/218 |
| 6,151,596 A | 11/2000 | Hosomi |
| 6,167,382 A | 12/2000 | Sparks et al. ................ 705/26 |
| 6,182,063 B1 | 1/2001 | Woods |
| 6,182,098 B1 | 1/2001 | Selker |
| 6,182,122 B1 * | 1/2001 | Berstis ........................ 709/217 |
| 6,185,551 B1 | 2/2001 | Birrell et al. ................... 707/3 |
| 6,269,361 B1 | 7/2001 | Davis et al. .................... 707/3 |
| 6,330,589 B1 | 12/2001 | Kennedy |
| 6,332,127 B1 | 12/2001 | Bandera et al. ............. 705/14 |
| 6,350,066 B1 | 2/2002 | Bobo, II |
| 6,356,834 B2 | 3/2002 | Hancock et al. ........... 701/200 |
| 6,381,465 B1 | 4/2002 | Chern et al. ................ 455/466 |
| 6,396,513 B1 | 5/2002 | Helfman et al. |
| 6,401,075 B1 | 6/2002 | Mason et al. ................ 705/14 |
| 6,408,297 B1 | 6/2002 | Ohashi |
| 6,421,694 B1 | 7/2002 | Nawaz et al. |
| 6,438,564 B1 | 8/2002 | Morton et al. |
| 6,449,657 B2 | 9/2002 | Stanbach, Jr. et al. ...... 709/245 |
| 6,493,702 B1 | 12/2002 | Adar et al. |
| 6,493,703 B1 | 12/2002 | Knight et al. |
| 6,505,046 B1 | 1/2003 | Baker ......................... 455/456 |
| 6,507,351 B1 | 1/2003 | Bixler |
| 6,522,875 B1 | 2/2003 | Dowling et al. ............ 455/414 |
| 6,549,957 B1 | 4/2003 | Hanson et al. |
| 6,571,279 B1 | 5/2003 | Herz et al. .................. 709/217 |
| 6,587,835 B1 | 7/2003 | Treyz et al. .................. 705/14 |
| 6,594,658 B2 | 7/2003 | Woods |
| 6,594,693 B1 | 7/2003 | Borwankar |
| 6,606,644 B1 | 8/2003 | Ford et al. .................. 709/203 |
| 6,640,239 B1 | 10/2003 | Gidwani |
| 6,654,735 B1 | 11/2003 | Eichstaedt et al. ............ 707/3 |
| 6,665,668 B1 | 12/2003 | Sugaya et al. |
| 6,683,627 B1 | 1/2004 | Ullmann et al. |
| 6,708,205 B2 | 3/2004 | Sheldon et al. |
| 6,714,975 B1 * | 3/2004 | Aggarwal et al. .......... 709/224 |
| 6,725,228 B1 | 4/2004 | Clark et al. |
| 6,732,152 B2 | 5/2004 | Lockhart et al. ........... 709/206 |
| 6,742,042 B1 | 5/2004 | Holden et al. |
| 6,745,197 B2 | 6/2004 | McDonald |
| 6,757,740 B1 | 6/2004 | Parekh et al. ............... 709/245 |
| 6,757,889 B1 | 6/2004 | Ito |
| 6,771,291 B1 | 8/2004 | DiStefano, III |
| 6,785,869 B1 | 8/2004 | Berstis |
| 6,788,769 B1 | 9/2004 | Waites ..................... 379/93.24 |
| 6,820,081 B1 | 11/2004 | Kawai et al. |
| 6,834,276 B1 | 12/2004 | Jensen et al. |
| 6,847,969 B1 | 1/2005 | Mathai et al. .............. 707/100 |
| 6,847,992 B1 * | 1/2005 | Haitsuka et al. ............ 709/218 |
| 6,889,361 B1 | 5/2005 | Bates et al. |
| 6,892,196 B1 | 5/2005 | Hughes |
| 6,947,396 B1 | 9/2005 | Salmi ......................... 370/310 |
| 6,973,481 B2 | 12/2005 | MacIntosh et al. |
| 6,983,139 B2 | 1/2006 | Dowling et al. ......... 455/414.2 |
| 6,983,311 B1 | 1/2006 | Haitsuka et al. ............ 709/217 |
| 6,985,882 B1 | 1/2006 | Del Sesto .................... 705/37 |
| 6,993,553 B2 | 1/2006 | Kaneko et al. ............. 709/201 |
| 6,999,941 B1 * | 2/2006 | Agarwal .................... 705/26.2 |
| 7,013,263 B1 * | 3/2006 | Isaka et al. .................... 704/9 |
| 7,017,173 B1 | 3/2006 | Armstrong et al. |
| 7,031,961 B2 * | 4/2006 | Pitkow et al. .................... 1/1 |
| 7,035,903 B1 | 4/2006 | Baldonado |
| 7,039,599 B2 | 5/2006 | Merriman .................... 705/14 |
| 7,043,690 B1 | 5/2006 | Bates et al. |
| 7,062,572 B1 * | 6/2006 | Hampton .................... 709/245 |
| 7,069,300 B2 | 6/2006 | Toyota et al. |
| 7,089,278 B1 | 8/2006 | Churchill et al. |
| 7,107,544 B1 | 9/2006 | Luke |
| 7,120,668 B2 | 10/2006 | Manber et al. |
| 7,136,875 B2 | 11/2006 | Anderson et al. .......... 707/104.1 |
| 7,136,915 B2 | 11/2006 | Rieger, III .................. 709/223 |
| 7,139,850 B2 | 11/2006 | Amemiya et al. |
| 7,143,135 B2 | 11/2006 | Smith et al. |
| 7,171,429 B2 | 1/2007 | Frieden et al. |
| 7,188,356 B1 * | 3/2007 | Miura et al. .................. 725/46 |
| 7,203,727 B2 | 4/2007 | Suzuki et al. ............... 709/206 |
| 7,243,080 B2 | 7/2007 | Bhadra ......................... 705/28 |
| 7,328,242 B1 | 2/2008 | McCarthy et al. |
| 7,356,772 B2 | 4/2008 | Brownholtz et al. |
| 7,359,936 B2 | 4/2008 | Gruen et al. |
| 7,376,714 B1 * | 5/2008 | Gerken ....................... 709/219 |
| 7,383,307 B2 | 6/2008 | Kirkland et al. |
| 7,412,437 B2 | 8/2008 | Moody et al. |
| 7,421,690 B2 | 9/2008 | Forstall et al. |
| 7,433,920 B2 | 10/2008 | Blagsvedt et al. |
| 7,478,414 B1 * | 1/2009 | Glusker et al. ................. 725/9 |
| 7,484,175 B2 | 1/2009 | Kirkland |
| 7,487,112 B2 | 2/2009 | Barnes, Jr. ................... 705/26 |
| 7,565,534 B2 | 7/2009 | Starbuck et al. |
| 7,584,208 B2 * | 9/2009 | Spivack et al. .................. 1/1 |
| 7,584,251 B2 | 9/2009 | Brown et al. ............... 709/206 |
| 7,599,852 B2 | 10/2009 | Bosarge et al. |
| 7,643,352 B2 | 1/2010 | Chen |
| 7,668,832 B2 | 2/2010 | Yeh et al. ..................... 707/10 |
| 7,693,866 B1 | 4/2010 | Weaver et al. |
| 7,707,283 B2 * | 4/2010 | Tsunoda et al. ............. 709/224 |
| 7,716,593 B2 | 5/2010 | Durazo et al. |
| 7,730,113 B1 | 6/2010 | Payette et al. |
| 7,788,326 B2 | 8/2010 | Buchheit et al. |
| 7,827,055 B1 * | 11/2010 | Snodgrass et al. ......... 705/14.26 |
| 7,903,099 B2 | 3/2011 | Baluja |
| 7,904,510 B2 | 3/2011 | Anderson et al. |
| 7,912,904 B2 | 3/2011 | Buchheit et al. |
| 7,953,741 B2 * | 5/2011 | Shih et al. .................... 707/751 |
| 7,979,501 B1 * | 7/2011 | Coleman et al. ............ 709/207 |
| 8,150,924 B2 * | 4/2012 | Buchheit et al. ............ 709/206 |
| 8,327,270 B2 * | 12/2012 | Jones et al. .................. 715/733 |
| 2001/0016845 A1 | 8/2001 | Tribbensee |
| 2001/0042100 A1 | 11/2001 | Guedalia et al. |
| 2001/0047272 A1 | 11/2001 | Frietas et al. |
| 2001/0047294 A1 | 11/2001 | Rothschild |
| 2001/0054066 A1 | 12/2001 | Spitzer ........................ 709/203 |
| 2002/0010775 A1 | 1/2002 | Rakavy et al. |
| 2002/0010794 A1 * | 1/2002 | Stanbach, Jr. et al. ...... 709/245 |
| 2002/0032771 A1 | 3/2002 | Gledge ........................ 709/224 |
| 2002/0046099 A1 * | 4/2002 | Frengut et al. ............... 705/14 |
| 2002/0052925 A1 * | 5/2002 | Kim et al. ................... 709/217 |
| 2002/0073156 A1 | 6/2002 | Newman |
| 2002/0078158 A1 | 6/2002 | Brown et al. ............... 709/206 |
| 2002/0078441 A1 * | 6/2002 | Drake et al. .................... 725/9 |
| 2002/0083140 A1 * | 6/2002 | Shin et al. .................. 709/206 |
| 2002/0087631 A1 * | 7/2002 | Sharma ...................... 709/203 |
| 2002/0094868 A1 * | 7/2002 | Tuck et al. .................... 463/42 |
| 2002/0107735 A1 * | 8/2002 | Henkin et al. ................ 705/14 |
| 2002/0116494 A1 * | 8/2002 | Kocol ......................... 709/224 |
| 2002/0165923 A1 | 11/2002 | Prince ......................... 709/206 |
| 2002/0178225 A1 | 11/2002 | Madenberg et al. |
| 2002/0188689 A1 | 12/2002 | Michael ...................... 709/206 |
| 2002/0188699 A1 | 12/2002 | Ullman et al. ............. 709/219 |
| 2002/0194229 A1 | 12/2002 | Decime et al. |
| 2003/0009385 A1 | 1/2003 | Tucciarone et al. |
| 2003/0020749 A1 * | 1/2003 | Abu-Hakima et al. ...... 345/752 |
| 2003/0037140 A1 * | 2/2003 | Aaltonen ..................... 709/225 |
| 2003/0050916 A1 * | 3/2003 | Ortega et al. .................. 707/1 |
| 2003/0055711 A1 | 3/2003 | Doherty |
| 2003/0069029 A1 | 4/2003 | Dowling et al. ............ 455/456 |
| 2003/0088554 A1 * | 5/2003 | Ryan et al. ..................... 707/3 |
| 2003/0093315 A1 | 5/2003 | Sato |
| 2003/0101065 A1 | 5/2003 | Rohall et al. |

(56) References Cited

U.S. PATENT DOCUMENTS

| | | |
|---|---|---|
| 2003/0110227 A1 | 6/2003 | O'Hagan |
| 2003/0135555 A1 | 7/2003 | Birrell et al. |
| 2003/0145285 A1 | 7/2003 | Miyahira et al. |
| 2003/0163537 A1 | 8/2003 | Rohall et al. |
| 2003/0167310 A1 | 9/2003 | Moody et al. |
| 2003/0177190 A1 | 9/2003 | Moody et al. |
| 2003/0191689 A1 | 10/2003 | Bosarge et al. ............... 705/14 |
| 2003/0195801 A1* | 10/2003 | Takakura et al. .............. 705/14 |
| 2003/0229607 A1 | 12/2003 | Zellweger et al. |
| 2003/0233419 A1* | 12/2003 | Beringer .................. 709/206 |
| 2004/0044735 A1 | 3/2004 | Hoblit |
| 2004/0048604 A1* | 3/2004 | Idei ........................ 455/414.1 |
| 2004/0054737 A1 | 3/2004 | Daniell |
| 2004/0059712 A1* | 3/2004 | Dean et al. .................. 707/1 |
| 2004/0068435 A1* | 4/2004 | Braunzell .................. 705/14 |
| 2004/0078432 A1 | 4/2004 | Manber et al. |
| 2004/0083133 A1* | 4/2004 | Nicholas et al. ............ 705/14 |
| 2004/0083265 A1 | 4/2004 | Beringer |
| 2004/0098488 A1 | 5/2004 | Mayers |
| 2004/0133564 A1 | 7/2004 | Gross et al. |
| 2004/0153509 A1 | 8/2004 | Alcorn et al. |
| 2004/0181580 A1 | 9/2004 | Baranshamaje ............ 709/206 |
| 2004/0199589 A1 | 10/2004 | Keohane et al. |
| 2004/0199623 A1* | 10/2004 | Houri ........................ 709/223 |
| 2004/0205141 A1 | 10/2004 | Goland |
| 2004/0210587 A1 | 10/2004 | Reysa |
| 2004/0260710 A1 | 12/2004 | Marston et al. |
| 2004/0260756 A1* | 12/2004 | Forstall et al. .............. 709/200 |
| 2004/0267700 A1 | 12/2004 | Dumais et al. |
| 2005/0004990 A1 | 1/2005 | Durazo et al. |
| 2005/0015394 A1* | 1/2005 | McKeeth .................. 707/100 |
| 2005/0033657 A1* | 2/2005 | Herrington et al. .......... 705/26 |
| 2005/0038861 A1 | 2/2005 | Lynn et al. ................ 709/206 |
| 2005/0050027 A1* | 3/2005 | Yeh et al. .................... 707/3 |
| 2005/0060310 A1* | 3/2005 | Tong et al. .................. 707/7 |
| 2005/0060643 A1 | 3/2005 | Glass et al. |
| 2005/0076051 A1* | 4/2005 | Carobus et al. ............ 707/102 |
| 2005/0076132 A1 | 4/2005 | Roberts et al. ............. 709/228 |
| 2005/0086598 A1 | 4/2005 | Marshall, III et al. |
| 2005/0091320 A1 | 4/2005 | Kirsch et al. |
| 2005/0102292 A1* | 5/2005 | Tamayo et al. ............ 707/10 |
| 2005/0108345 A1 | 5/2005 | Suzuki |
| 2005/0114781 A1 | 5/2005 | Brownholtz et al. |
| 2005/0130685 A1 | 6/2005 | Jenkin |
| 2005/0131715 A1 | 6/2005 | Trethewey ................. 705/1 |
| 2005/0131884 A1* | 6/2005 | Gross et al. .................. 707/3 |
| 2005/0137939 A1 | 6/2005 | Calabria et al. ............. 705/26 |
| 2005/0138002 A1 | 6/2005 | Giacobbe et al. |
| 2005/0144157 A1 | 6/2005 | Moody et al. |
| 2005/0144241 A1 | 6/2005 | Stata et al. |
| 2005/0149397 A1* | 7/2005 | Morgenstern et al. ......... 705/14 |
| 2005/0160107 A1* | 7/2005 | Liang ...................... 707/100 |
| 2005/0165896 A1 | 7/2005 | Mooney .................... 709/206 |
| 2005/0177401 A1* | 8/2005 | Koeppel et al. ............. 705/4 |
| 2005/0182765 A1* | 8/2005 | Liddy ........................ 707/5 |
| 2005/0187823 A1 | 8/2005 | Howes ...................... 705/14 |
| 2005/0198173 A1 | 9/2005 | Evans |
| 2005/0198256 A1 | 9/2005 | Moody et al. |
| 2005/0216454 A1* | 9/2005 | Diab et al. .................. 707/3 |
| 2005/0216516 A1* | 9/2005 | Calistri-Yeh et al. ....... 707/104.1 |
| 2005/0222900 A1* | 10/2005 | Fuloria et al. ............. 705/14 |
| 2005/0222985 A1* | 10/2005 | Buchheit et al. ............. 707/3 |
| 2005/0223058 A1* | 10/2005 | Buchheit et al. ........... 709/203 |
| 2005/0223066 A1 | 10/2005 | Buchheit et al. |
| 2005/0262203 A1* | 11/2005 | Buchheit et al. .......... 709/206 |
| 2006/0020510 A1* | 1/2006 | Vest ........................ 705/14 |
| 2006/0026046 A1* | 2/2006 | Yaron et al. ................ 705/7 |
| 2006/0026593 A1 | 2/2006 | Canning et al. |
| 2006/0031304 A1 | 2/2006 | Bagga et al. |
| 2006/0064346 A1 | 3/2006 | Steenstra et al. |
| 2006/0075445 A1* | 4/2006 | O'Kane .................... 725/100 |
| 2006/0080303 A1* | 4/2006 | Sargent et al. ............. 707/3 |
| 2006/0085434 A1* | 4/2006 | Mah et al. ................. 707/100 |
| 2006/0092920 A1* | 5/2006 | Karamchedu et al. ....... 370/352 |
| 2006/0123091 A1 | 6/2006 | Ho |
| 2006/0129455 A1* | 6/2006 | Shah ........................ 705/14 |
| 2006/0129943 A1* | 6/2006 | Maguire .................. 715/751 |
| 2006/0149677 A1 | 7/2006 | Shahine et al. |
| 2006/0167747 A1* | 7/2006 | Goodman et al. ........... 705/14 |
| 2006/0179127 A1 | 8/2006 | Randall .................... 709/219 |
| 2006/0184617 A1 | 8/2006 | Nicholas et al. ........... 709/203 |
| 2006/0248209 A1 | 11/2006 | Chiu et al. |
| 2006/0259473 A1* | 11/2006 | Li et al. ...................... 707/3 |
| 2006/0294084 A1* | 12/2006 | Patel et al. .................. 707/3 |
| 2007/0005715 A1* | 1/2007 | LeVasseur et al. .......... 709/206 |
| 2007/0033531 A1* | 2/2007 | Marsh ..................... 715/738 |
| 2007/0047697 A1 | 3/2007 | Drewry et al. |
| 2007/0050372 A1* | 3/2007 | Boyle ...................... 707/10 |
| 2007/0067404 A1 | 3/2007 | Brown et al. |
| 2007/0088801 A1 | 4/2007 | Levkovitz et al. |
| 2007/0088851 A1 | 4/2007 | Levkovitz et al. |
| 2007/0088852 A1 | 4/2007 | Levkovitz |
| 2007/0143411 A1 | 6/2007 | Costea et al. |
| 2007/0143428 A1 | 6/2007 | Kumar et al. |
| 2007/0157119 A1 | 7/2007 | Bishop |
| 2007/0198639 A1 | 8/2007 | Litwin et al. |
| 2007/0255791 A1 | 11/2007 | Bodlaender et al. |
| 2007/0294740 A1* | 12/2007 | Drake et al. ............... 725/131 |
| 2008/0022211 A1* | 1/2008 | Jones et al. ............... 715/739 |
| 2008/0147815 A1 | 6/2008 | Damm et al. |
| 2008/0275873 A1* | 11/2008 | Bosarge et al. .............. 707/5 |
| 2008/0313292 A1 | 12/2008 | Forstall et al. |
| 2010/0280903 A1 | 11/2010 | Barlin et al. |
| 2010/0299326 A1 | 11/2010 | Germaise |
| 2011/0264750 A1 | 10/2011 | Fabre et al. |
| 2012/0226760 A1* | 9/2012 | Lewis ...................... 709/206 |

FOREIGN PATENT DOCUMENTS

| | | |
|---|---|---|
| JP | 2001-222477 | 8/2001 |
| JP | 2002-359667 (A) | 12/2002 |
| JP | 2003-030216 | 1/2003 |
| JP | 2003-108278 (A) | 4/2003 |
| WO | WO 97/21183 | 6/1997 |
| WO | WO 00/23931 | 4/2000 |
| WO | WO 00/54201 | 9/2000 |
| WO | WO 01/61551 A1 | 8/2001 |
| WO | WO 01/63512 A1 * | 8/2001 |
| WO | WO 03/058519 A2 | 7/2003 |
| WO | WO 03/067497 A1 | 8/2003 |

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

Bellotti, V. et al., "Taskmaster: recasting email as task management," PARC, CSCW '02 Workshop on Redesigning Email for the 21st Century.

Comer, D. and Peterson, L., "Conversation-Based Mail," ACM Transactions on Computer Systems (TOCS) vol. 4, Issue 4, pp. 299-319, Nov. 1986.

Flores, F. et al., "Computer Systems and the design of organizational interaction," ACM Transactions on Information Systems., pp. 153-172, (1988).

Shepherd, A. et al., "Strudel—an extensible electronic conversation toolkit," Proceedings of the 1990 ACM Conference on Computer-supported Cooperative Work, Los Angeles, California, United States, pp. 93-104.

Venolia, G., et al., "Supporting Email Workflow,"Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is," pp. 256A-260, Byte, Dec. 1988.

Zawinski, J., "Message Threading," http://www.jwz.org/doc/threading.html, pp. 1-9 (1997-2002).

AdForce, Inc., A Complete Guide to AdForce, Version 2.6, 1998.

(56) References Cited

OTHER PUBLICATIONS

AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
95/001,073, Reexamination of Stone et al.
95/001,061, Reexamination of Stone et al.
95/001,069, Reexamination of Dean et al.
95/001,068, Reexamination of Stone et al.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., *Advertising on the Internet*, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073, Jul. 30, 2008.
Request for Reexamination of U.S. Patent No. 6,446,045 B1, Control No. 95/001,061, Jul. 7, 2008.
Request for Reexamination of U.S. Patent No. 7,249,059 B2, Control No. 95/001,069, Jul. 21, 2008.
Request for Reexamination of U.S. Patent No. 6,829,587 B2, Control No. 95/001,068, Jul. 14, 2008.
Digital Envoy Press Releases, "Double click and Digital Envoy Partner to Offer Advanced Geo-Targeting Solutions," Mar. 23, 2003, 2 pages.
Friedman, N., "Dashboard," Jul. 25, 2003, 24 pages.
NetGravity AdServer AdMaster's Guide, Mar. 11, 1997, 59 pages.
About Microsoft Word screen shot, May 28, 2007, 1 pg.
Apple Computer Inc, Mail 1.3.3 Help: Checking Spelling in Email, Aug. 31, 2004, 1 pg.
Apple Computer Inc., Mac mail utility screenshot (Aug. 18, 2004), 1 pg.
Courter, Mastering Microsoft Office 2000—Professional Edition, p. 3.
Courter, Mastering Microsoft Office 2000—Professional Edition, pp. 36-37 and 92-94.
Gmail beta About Gmail, Apr. 20, 2004, 2 pgs.
Gmail beta Sneak Peek of Conversation View, Apr. 20, 2004, 1 pg.
Gmail beta Sneak Peek of Gmail Inbox, Apr. 20, 2004, 1 page.
Google, European Search Report, EP 11172427.4, Dec. 21, 2011, 6 pgs.
Google, IPRP, PCT/US2005/006826, Oct. 4, 2006, 4 pgs.
Google, ISR/WO, PCT/US2005/006826, Jun. 26, 2006, 7 pgs.
Google, ISR/WO, PCT/US2005/010137, Jun. 3, 2005, 4 pgs.
Google, Notice of Acceptance, AU 2011203058, Jan. 6, 2012, 3 pgs.
Google, Office Action, AU 2011201989, Apr. 12, 2012, 3 pgs.
Google, Office Action, AU 2011201991, Mar. 8, 2012, 2 pgs.
Google, Office Action, AU 2011201992, Aug. 16, 2012, 3 pgs.
Google, Office Action, AU 2011201993, Feb. 28, 2012, 2 pgs.
Google, Office Action, AU 2011201994, Mar. 8, 2012, 2 pgs.
Google, Office Action, AU 2011203058, Oct. 31, 2011, 1 pg.
Google, Office Action, CN 200580016413.8, Jul. 2, 2012, 3 pgs.
Google, Office Action, CN 200580016413.8, Dec. 19, 2011, 3 pgs.
Google, Office Action, JP 2010-275595, Jul. 6, 2012, 4 pgs.
Google, Office Action, KR 2006-7022840, Jan. 26, 2012, 4 pgs.
Google, Office Action, KR 2011-7017094, Sep. 26, 2011, 5 pgs.
Google, Office Action, KR 2011-7017095, Sep. 29, 2011, 5 pgs.
Google, Office Action, KR 2011-7017096, Oct. 4, 2011, 4 pgs.
Google, Office Action, KR 2011-7017098, Oct. 4, 2011, 3 pgs.
Google, Office Action, KR 2011-7017102, Oct. 4, 2011, 4 pgs.
Google, Supplemental ESR, EP 05724384.2, Mar. 16, 2009, 5 pgs.
Gorman, The Next Major Email Domain: Gmail.com, Jun. 2004, 6 pgs.
Lawrence, Context and page analysis for improved web search, Oct. 31, 1998, 9 pgs.
O'Hara, Easy Microsoft Office Outlook 2003, Sep. 18, 2003, 44 pgs.
Resnick, Network Working Group, RFC 2822, 70 pgs, Apr. 2001.
Russel, Special Edition Using Microsoft Office Outlook 2003, Sep. 25, 2003, 102 Pgs.
Screenshot of reply to message in Lotus Notes 6.5, Aug. 6, 2007, 1 pg.
Syroid, Outlook 2000 in a Nutshell, May 2, 2000, O'Reilly, pp. 1-66.
Thies, Special Report: How to Prosper With The New Google, 2004, 17 pgs.
Tobias, Dan's Mail Format Site, Feb. 2, 2009, 6 pgs.
Tyson, Sams Teach Yourself Microsoft Outlook 2000 in 24 Hours, 1999, pp. 237.

\* cited by examiner

SYSTEM AND METHOD FOR TARGETING INFORMATION ITEMS BASED ON POPULARITIES OF THE INFORMATION ITEMS

RELATED APPLICATIONS

This application is related to U.S. patent application Ser. No. 10/914,035, filed Aug. 6, 2004, entitled "Displaying Conversations in a Conversation-Based Email System," which is incorporated by reference herein in its entirety. This application is also related to U.S. patent application Ser. No. 11/111,166, filed Apr. 20, 2005, entitled "System and Method for Targeting Information Based on Message Content," which is incorporated by reference herein in its entirety.

TECHNICAL FIELD

The disclosed embodiments relate generally to providing information to computer users, and in particular, to provide information items to a computer user based on their popularity.

BACKGROUND

As with traditional advertising, online advertising seeks to provide advertisements to those individuals most likely to respond to the advertisement in a desired way, for example, by purchasing a product or service. One way advertisers target a user is to provide advertisements that are related to the content of a web page that the user is viewing. This application concerns additional methods and systems for targeting online advertisements to individuals so as to improve the likelihood that the individuals receiving the online advertisements will be sufficiently interested in the advertisements to click through links to the advertisements or associated content.

SUMMARY OF DISCLOSED EMBODIMENTS

According to some embodiments, a method of selecting information items in connection with an electronic message is disclosed. The method includes selecting a plurality of information items satisfying a predefined popularity condition, each of the information items having an associated keyword, and identifying one or more of the selected information items whose associated keyword is found in the electronic message. In some embodiments, a set of candidate items are selected periodically based on their respective popularity metrics. The popularity metric of an information item may be its clickthrough rate during a predefined time period. Each candidate information item has one or more keywords and the number of the keywords found in the electronic message determines the item's relevancy to a user accessing the message. In some other embodiments, the method selects a subset of the information items using user geographical information associated with a user accessing the electronic message from a client and at least one of the selected information items is targeted to users at a location corresponding to the user geographical information.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

DESCRIPTION OF EMBODIMENTS

Figure 1:
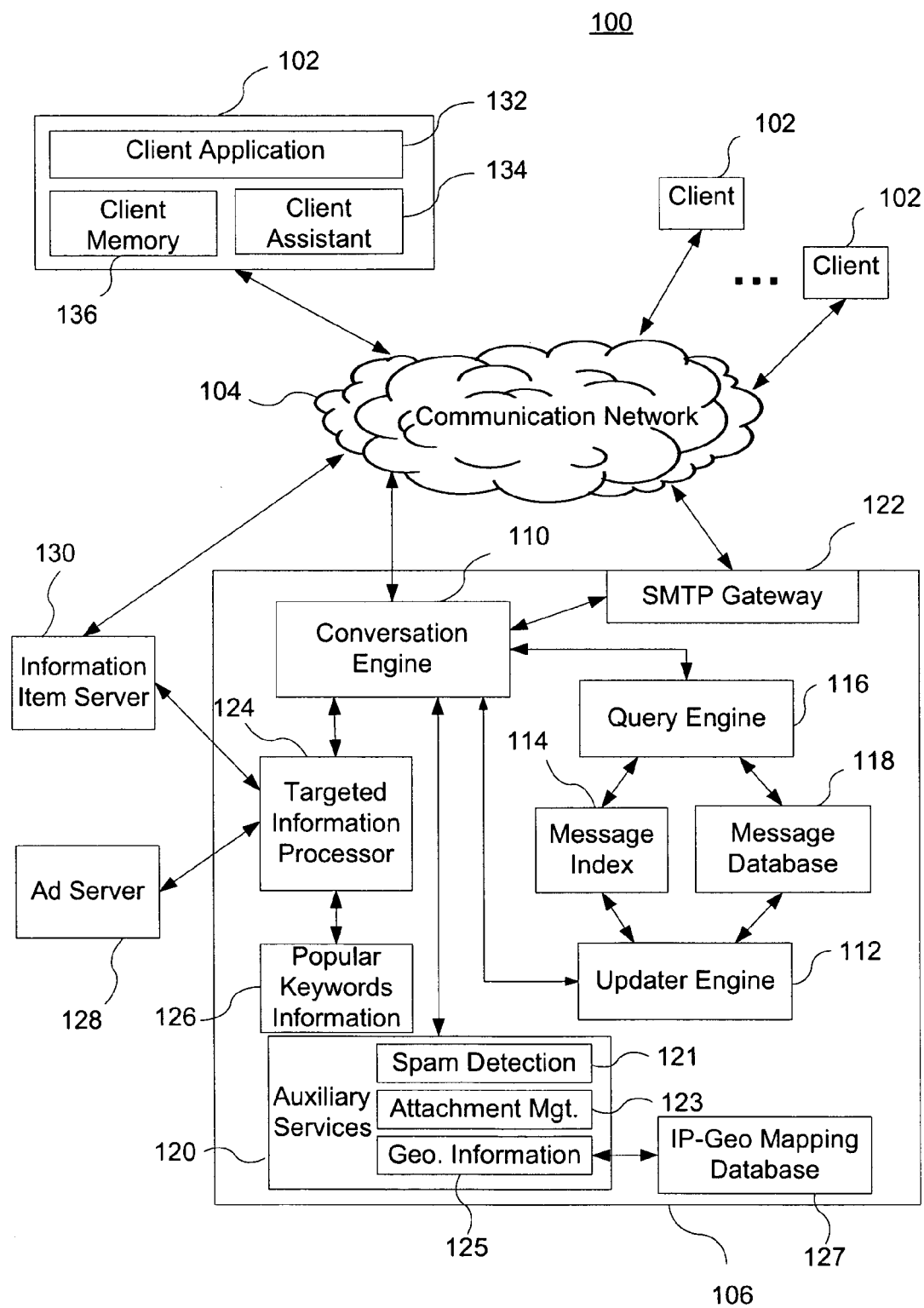
FIG. 1 is a block diagram of an exemplary environment that generates targeted information items based on their popularities in accordance with some embodiments of the present invention.

FIG. 1 is a block diagram of a system 100 for implementing some embodiments of the invention. One or more clients 102 can be connected to a communication network 104. The communication network 104 can be connected to an information service 106. The information service 106 can include a conversation engine 110, an updater engine 112, a message index 114, a query engine 116, a message database 118, one or more auxiliary services servers 120, an SMTP gateway 122, a targeted information processor 124, and popular keywords information 126. The targeted information processor 124 can be connected to an advertisement server 128 and/or one or more information item servers 130.

The client 102 can be any of a number of devices (e.g., a computer, an interne kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to monitoring a user's activities with respect to the client application 132 and/or other applications, searching or browsing for resources (e.g., files) on the client 102, and processing information received from or being sent to information service 106. The client assistant 134 can be part of the client application 132, available as a plug-in to the client application 132 (provided, for example, from various on-line sources), or provided as a stand-alone program. The client assistant can be a web-based messaging application such as the client executable portion of the Google Gmail product. A client memory 136 can store system information and information about a user, among other things.

The communication network 104 can be any local area network (LAN) and/or wide area network (WAN), such as an intranet, an extranet, or the Internet. It is sufficient that the communication network 104 provides communication capability between the clients 102 and the information service 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a web page, a document, an email message, an Instant Messaging (IM) message, a Short Message Service (SMS) message, a transcribed voice message, a database, an image, or a computational object.

The conversation engine 110 can respond to a variety of requests from the client assistant 134 related to messages and return conversation-based responses via its connection with the communication network 104. A conversation may include one or more relevant messages relating to a conversation topic. Various criteria can be used to determine which messages are parts of each distinct conversation. For example, an analysis can be made of the contents of messages received and/or sent by a user. Messages whose contents are found to be related can be grouped together. In another example, a thread identifier found in a message header can also be used to identify related messages. In a further example, a subject line in the message header can be used to identify related messages. The senders and recipients of the messages are participants in the conversation. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

The information service 106 can create a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the information service 106 is preparing a list of conversations in response to a search submitted by a user, the information service 106 can create a snippet for each conversation in the list, or for each conversation is a displayed portion of the list, the snippet including a portion of the conversation that matches user-submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the information service 106 and other email systems, messaging systems or information services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the messages.

The one or more auxiliary services servers 120 can provide additional services to the conversation engine 110. In some embodiments, the auxiliary services servers 120 include a spam detection module 121 for detecting and processing spam, an attachment management module 123 for managing the storage and retrieval of documents attached to messages, and a geographical information module 125 for extracting user geographical information from a login or message access request.

For example, when the information service 106 receives a login request initiated by a user from a client 102, it extracts an IP address of the client from the login request. The IP address is typically a 32-bit digital number that uniquely identifies the client on the Internet. The information service 106 includes an IP-Geo mapping database 127. The IP-Geo mapping database 127 includes many entries, each entry mapping one or more IP addresses to a specific geographical location. For example, the entry "171.64.*.*→Stanford, Calif. 94305" indicates that any IP address whose first eight bits correspond to the decimal value "171" and second eight bits correspond to the decimal value "64" refers to a computer located at Stanford, Calif. 94305. The geographical information module 125 is responsible for converting the IP address of the client into the client user's geographical location. This geographical location is used subsequently by the advertisement server 128 and the information item server 130 for selecting one or more information items relevant to the user's geographical location. In some other embodiments, the service provided by the geographical information module 125 and the IP-Geo mapping database 127 may be delegated to a geographical information server that is connected to the information service 106. Upon receiving a login or message access request, the information service 106 forwards the IP address included in the request to the geographical information server. The geographical information server returns to the information service 106 the geographical location corresponding to the IP address.

As mentioned above, the conversation engine 110 can be connected to the targeted information processor 124. The targeted information processor 124 can provide geo-targeted and/or content-targeted information for display to a user at client 102. The targeted information processor 124 can provide, for example, advertisements and/or other information items related to the user's messages being handled by the conversation engine 110. In some embodiments, the messages include not only messages received by the user but also messages authored and sent by the user. In some other embodiments, the advertisements may be only related to a user's geographical location, not to the message content at all. This scenario may be appropriate in some special circumstances, e.g., when the user is on a business trip and away from the location where the user usually logs into his or her account. Advertisements are herein defined to include information items, or links to information items, that offer or promote products, services, events, companies, organizations, ideas or the like.

The targeted information processor 124 can be connected to popular keywords information 126. In some embodiments, the popular keywords information 126 includes a plurality of keywords associated with a set of advertisements deemed to be most popular by a group of users within a predefined time period. The popular keywords information can be used to determine whether there are any popular advertisements whose associated keyword(s) are found in a message being processed by the conversation engine 110. Similarly, popular advertisements may also have associated geographical locations, and a list of geographical locations associated with the popular advertisements may be compared with the user's current geographical location to determine whether there are any popular advertisements targeted at users at the same geographical location as the user. If no popular keyword is found in the message, and (optionally) no geographical location associated with popular advertisements matches the user's geographical location, there is no need for the targeted information processor 124 to launch request(s) for popular advertisements against the advertisement server 128 and/or the information item server 130. Otherwise, the targeted information processor 124 may obtain popular advertisements and other popular information items from advertisement server 128 and information item server 130, respectively.

FIG. 1 is exemplary. In some embodiments, the information service 106 contains a subset or superset of those elements illustrated in the figure. Although FIG. 1 shows the information service 106 as a number of discrete elements, this figure is intended more as a functional description of the various features which may be present in the information service 106 than as a structural schematic of the various embodiments. In practice, and as recognized by those of ordinary skill in the art, some elements shown separately could be combined and some elements could be further divided into sub-elements or parallel elements. For example, some separate elements in the figure could be implemented by a single server or module and some single elements could be implemented by one or more servers or modules. The actual number of servers in information service 106 and how features are allocated among the servers will vary from one implementation to another, and may depend in part on the amount of traffic that the system must handle during peak usage periods as well as during average usage periods. For example, the message database 118 can be implemented using a plurality of servers if the information service 106 manages a large volume of messages associated with a large number of user accounts.

As mentioned above, the client 102 can include client application 132 and client assistant 134. Client application 132 can provide a window to be displayed on a displaying device (e.g., a monitor) for rendering conversations and targeted information. The conversations, targeted information and messages in the conversations can be encoded using HyperText Markup Language (HTML), XML, or any other appropriate markup language or encoding scheme, and then rendered by the client application 132. When a user submits a request through client application 132 to the information service 106 to access messages stored in the user's account, the information service 106 identifies conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In another embodiment, client assistant 134 may alternatively exist and operate in the information service 106.

The information service 106 and client assistant 134 work in concert to allow a user to view, compose, send and/or search messages in the user's message account and to present the search results in a highly intuitive fashion. The information service 106 extracts information from a user's message account by processing messages received, sent and/or being composed by the user, and the client assistant 134 assists in rendering the information prepared by the information service 106. In other embodiments a different division of duties between the information service 106 and the client assistant 134 can be implemented. Because many of the tasks performed by the system can be performed by either the information service 106 or the client assistant 134 or by the two working together, these two components are sometimes herein referred to jointly as the "conversation system".

The conversation system can provide at least two different views, including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of the identifiers or names of the senders of messages in the conversation, a conversation description (e.g., a subject line of the message), a date/time value of the conversation (e.g., a date/time value of the last received message in the conversation), and a snippet from one or more of the messages in the conversation. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, header information including names or other identifiers of the sender and the recipients of the message, a date/time value indicative of when the message is received or sent, routing information, and other properties of the message. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages can be displayed in various views (and can include portions of messages) such as a message view or a thread view where related messages can be displayed.

In some embodiments, when a conversation is being displayed in the conversation view, additional, targeted information (sometimes herein called "informational items") can be displayed in the display window. For example, one or more advertisements relevant to, or related to, one or more of the messages in the conversation can be displayed. In another example, one or more other types of information can be displayed. Such other information can include, but is not limited to news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

RSS feeds can be content distributed from various sources on a network (e.g., the Internet). RDF Site Summary (RSS) (and sometimes, Real Simple Syndication) is an XML-based lightweight multi-purpose extensible metadata description and syndication format. RSS is typically used for distributing various types of content to a number of receivers simultaneously. News items can be news items from one or more sources. Blog events can be events generated from one or more web logs (blogs). User polls can be polls that the user may participate in which may come from a variety of sources. Stock prices can be stock prices of companies whose names or stock ticker symbols are mentioned in the conversation. Weather forecasts can be weather forecasts of locations like cities or states whose names are directly or indirectly referred to by a message in the conversation.

Figure 2:
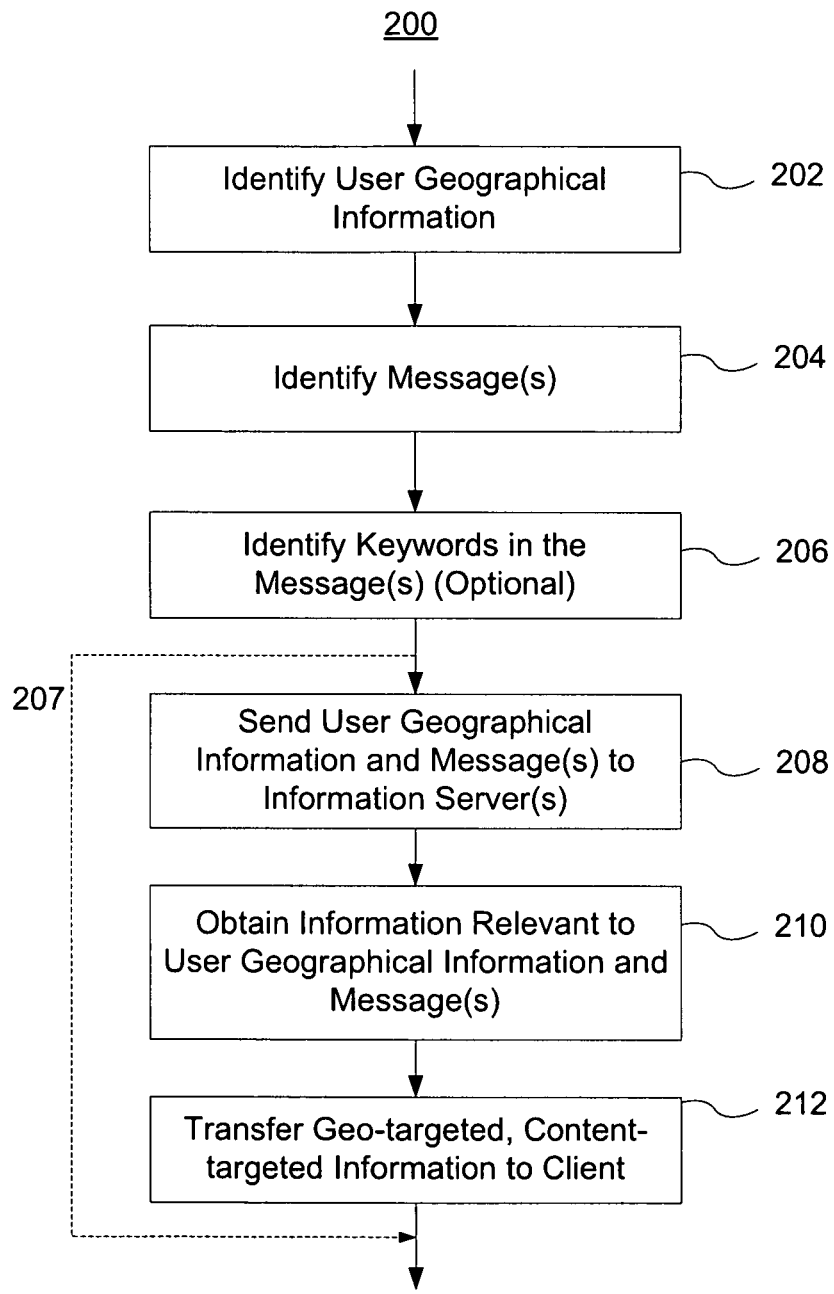
FIG. 2 is a flow diagram of a process of generating targeted information items in response to a message access request in accordance with some embodiments of the present invention.

FIG. 2 illustrates a process of generating targeted information items in response to a message access request in accordance with some embodiments of the present invention. Initially, the user's geographical information is identified (202). The user's geographical information may be generated and stored in the information service 106 when the user logs into his or her account at the information service 106. In some embodiments, the information service 106 extracts from the message access request the IP address of the requesting client and identifies the user's geographical information using the IP address. Next, a conversation including the requested message(s) is identified (204). For example, the requested message(s) may include an identifier of a conversation associated with the message. As mentioned above, a conversation can include one or more related messages. The identification at 204 can identify all of the messages in a conversation or selected messages in a conversation. Various selection criteria can be used when identifying selected messages in a conversation. For example, messages can be identified based on whether they were authored and sent by the user. Alternatively, messages can be identified based on whether a message was authored by the user within a predefined time period (e.g., the messages authored within the last 24 hours are identified). In another example, a conversation may be associated with a pool of messages of different types received or sent by the user, such as email messages, IM messages, transcribed voice messages, SMS messages and search query results. In this event, messages can be identified based on whether a message is of a particular type or types or a combination of two or more of the criteria mentioned above. For illustrative purposes, the following discussion assumes that the process of FIG. 2 is triggered by a user's act of clicking a conversation link in a conversation list view and is applied to one or more messages identified as members of the same conversation. But one skilled in the art will appreciate that the process of FIG. 2 could be triggered by other types of events as well.

Before the identified messages are transferred back to the requesting client, the information service 106 needs to determine if there are any popular advertisements targeted at the identified messages or targets at the user's current geographical location (206). Within the information service 106, the targeted information processor 124 is typically responsible for determining whether there are any popular advertisements associated with a requested message by checking if any advertisement-related keyword is found in the message. Optionally, the targeted information processor 124 may also determine whether there are any popular advertisements associated with the user's geographical location (or alternately stated, that are targeted at users at the user's current geographical location).

If there is no matching keyword in the message, and (optionally) there are no popular advertisements targets at users at the user's geographical location, the information service 106 may finish the process by bypassing the remaining steps 208-212 as indicated by line 207 of FIG. 2. As a result, the message or conversation identified at 204 may be displayed to the requesting user without being accompanied by any targeted information items. Alternately, the message or conversation identified at 204 may be displayed to the requesting user without being accompanied by any popular advertisements. Additional processes may be used to identify other targeted information to display to the requesting user along with the identified message or conversation.

If there is any matching keyword in the message (206), the information service 106 performs operations 208, 210, 212 in order to obtain those targeted information items. Note that operation 206 may be delegated to the advertisement server 128 or the information item server 130 in some embodiments.

In order to obtain targeted information from the advertisement server 128 or the information item server 130, the information service 106 sends the user geographical information and the messages to the information servers (208). The information servers, e.g., the advertisement server 128, search through a pool of candidate information items for those items that are most relevant to the user geographical information and the message content. Subsequently, the information service 106 receives from the information servers a set of popular information items targeted at the user geographical information and/or the messages (210) and transfers these geo-targeted and/or content-targeted information items to the requesting client for display (212). A more thorough description of the process of identifying relevant information items is provided below in connection with FIG. 4.

In order to display the information items on the client 102, the information service 106 may provide formatting information directing the display of the information obtained from the information servers. The obtained information is preferably displayed in a manner consistent with the user's expectation. For example, if the obtained information is associated with a conversation or a message in the conversation requested by the user, it is simultaneously displayed next to the requested conversation or message in a corresponding conversation view. If the obtained information items are associated with a message just sent by the user and the user expects to return to the conversation list view, the information items may be displayed at the top of the conversation list view in order to attract the user's attention. It will be understood by one skilled in the art that the aforementioned schemes of rendering the obtained information items in a display device are exemplary. Other rendering schemes may be used in other embodiments. Typically, the information items are displayed at a location within an application or browser window that is prominent, but consistent with the normal experience that users have with a particular information service.

In some embodiments, the task of identifying targeted information items is accomplished by, or primarily by the information service 106. For example, it is the targeted information processor 124 that is responsible for conducting semantic analysis of the message contents. The semantic analysis may include extracting concepts from the message contents, inferring from the concepts other relevant keywords, and grouping the concepts and keywords into categories. In these embodiments, the information servers 128, 130 are only responsible for choosing advertisements matching the concepts, keywords and categories.

However, in other embodiments, the information servers 128, 130 play a more significant role in the process of identifying targeted information items. In some embodiments, this process is divided into two sub-processes: (1) periodically identifying a set of keywords associated with the most popular advertisements under certain circumstances; and (2) selecting those advertisements and other information items whose associated keywords appear in the message. The one or more keywords associated with an advertisement may be the one or more keywords on which the provider of the advertisement has bid, as part of an auction process for determining placement of online advertisements. Keywords may be associated with other information items by automated content analysis or by human assignment of the keywords, or a combination of these techniques. Prior to further discussion of these two sub-processes, it is helpful to address the topic of how to measure the relevancy of an advertisement to a particular user.

In general, the relevancy of an on-line advertisement to a user viewing a web page or an email message depends on two factors: (1) how close the subject of the advertisement is to the web page or message content and (2) how likely the user is going to click the link to the advertisement when noticing its existence. The first factor can be measured, e.g., by the frequencies that keywords associated with the advertisement are found in the web page or message content. When the number or percentage of words within a message that match keywords associated with an advertisement or information item reaches a predetermined threshold, the advertisement or information item is deemed relevant to that message. In some embodiments, the relevancy of the keywords to the message can be measured by the number of unique keywords present in the message. The latter factor can be approximated by a popularity metric, such as the click-through rate of the advertisement during a predefined time period. The click-through rate of an advertisement is defined as the number of times that users clicked on links to the advertisement divided by the number of times that the advertisement was displayed to different users during a predefined time period. A shorthand version of this definition is "number of click-throughs divided by number of impressions," where each "impression" is the display or presentation of an item to a user. An advertisement having a high click-through rate (CTR) is more likely to be clicked than one having a low click-through rate provided that other conditions of the two advertisements are relatively equal. In other words, the actual click-through rate of an advertisement is treated as a proxy for its predicted click-through rate for the purpose of determining its relevancy to a user. In some embodiments, this predicted click-through rate may be further modulated by the user's personal profile. For example, a user's age, gender, educational, income level, and known or stated interests may affect the relevancy of an advertisement to the user. Therefore, in order to select more relevant information items for a message, it is necessary to determine their respective predicted click-through rates.

Figure 7:
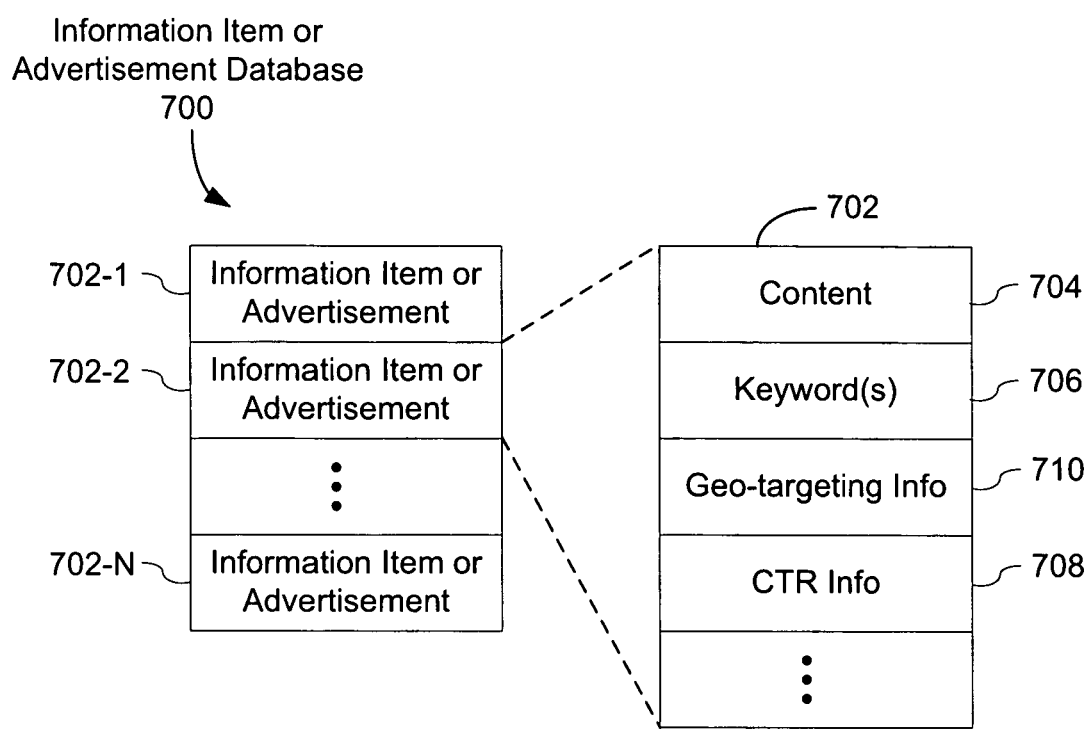
FIG. 7 is a block diagram of a database for advertisements or other information items.

FIG. 7 is a conceptual block diagram of a database 700 for storing advertisements, or other information items, and associated information. In various embodiments, the information in the database may be stored in multiple data structures, or even multiple computers, and need not be organized in the specific manner shown in FIG. 7. For instance, the database 700, may be stored and/or accessed by the information item server 130 and/or the advertisement server 128 of FIG. 1.

The database 700 includes a set of information items 702, which may include advertisements and/or other types of information items. For ease of explanation, both advertisements and other information items are herein called information items. Each information item 702 includes content 704, keywords 706 associated with the information item and click-through information 708. Optionally, a subset of the information items include geo-targeting information 710. Optionally, other fields or types of information may also be stored with or associated with one or more of the information items. Content 704 may include text, graphics, links to URLs or other content storage locations. The content 704 of one or more of the items 702 may optionally be preformatted for display, for example by including HTML tags. Keywords 706 are one or more keywords used to identify or select information items. Keywords for advertisements, and perhaps other types of information items as well, may be associated with bids. Bids are used in an auction or similar process for determining advertisement or information item selection and placement. Alternately, or in addition, bids may be used to determine debits or credits to be applied to one or more financial accounts when predefined events occur with respect to the associated advertisements or information items.

Geo-targeting information 710, when provided for an information item or advertisement, may be used to limit the users who receive the information item or advertisement to users whose current location is consistent with the geo-targeting information 710 for that information item or advertisement. Geo-targeting information 710 for particular information items may specify geographic regions of different sizes, including large regions (e.g., Canada, or New York State), small regions (e.g., locations within 1000 yards of a particular address in New York City), and regions of any intermediate size, such as a county (e.g., Santa Clara County, California), a metropolitan area (e.g., "the Bay area of Northern California"), a city (e.g., Palo Alto, Calif.), or any other well defined geographic region that is suitable for use in geo-targeting. As explained elsewhere in this document, a user's current location may be determined by the current IP address of user, or may be determined using other positioning mechanisms (e.g., if the client 102 is a cell phone, the cell phone network for the client 102 may provide information about the user's current location). In some embodiments, information items or advertisements that do not have geo-targeting information associated with them are assumed to be targeted to all users.

Click-through rate (CTR) information 708 for an information item includes one more CTR values. In the simplest implementations, the CTR information 708 for an information item is a single value representing the click-through rate for the information items for a predefined period of time. In other implementations, separate CTR values may be provide for a plurality of time periods (e.g., the last month, the last week, etc.), and/or for a plurality of geographic regions, and/or for a plurality of categories of users, and/or other groupings of the CTR information for the information item.

Figure 3:
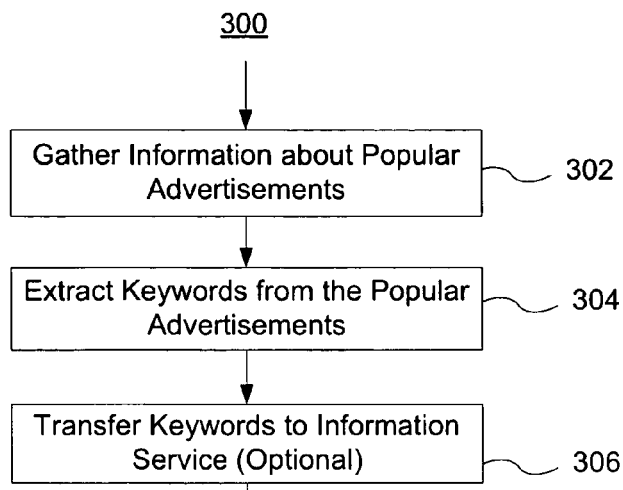
FIG. 3 illustrates an exemplary process of identifying most popular advertisements and their associated keywords in accordance with some embodiments of the present invention.

FIG. 3 illustrates an exemplary process of identifying most popular advertisements and their associated keywords in accordance with some embodiments of the present invention. In some embodiments, the advertisement server 128 periodically (e.g., daily or weekly) gathers information about popular advertisements (302). As mentioned above, the popularity of an advertisement may be measured by its click-through rate. The gathered information may also include the demographic and geographical distribution of users who have accessed the advertisement during this time period, e.g., the number of clicks on the links to the advertisement from a city or specific region. The gathered information may further include the communication channels through which the advertisement is served, which may include, but is not limited to websites, search engine, email/IM/SMS services, etc. This information, together with the click-through rate, helps to rank the popularity of the advertisement among different groups of users. For instance, the gathered information may be used to compute different click-through rates for different categories of users. The categories of users may be defined differently in different embodiments, using one or more factors such as location, time, communication channel, age and/or other personal characteristics. In some embodiments, only a subset of the popular advertisements may be selected as the candidates according to predefined criteria in order to save processing time and reduce the latency between a request and a response.

From the candidate popular advertisements, the advertisement server extracts their respective keywords (304). Each advertisement may has an associated bid on one or more keywords. In some embodiments, an advertisement is not considered relevant to a message if (A) none of its associated keywords are found in the message, or (B) the current location of the user is outside the targeted geographical region associated with the advertisement. In these embodiments, when an advertisement include geo-targeting information, the advertisement is only considered relevant to a message if the client 102 receiving or sourcing the message is located within (or optionally nearby) the advertisement's targeted geographical region, and at least one of the keywords of the advertisement are found in the message.

The extracted keywords associated with the candidate popular advertisements are transferred to the information service (306). As mentioned earlier, the information service may use these keywords to determine whether a message contains any keywords in a proactive manner (206 of FIG. 2).

Figure 4:
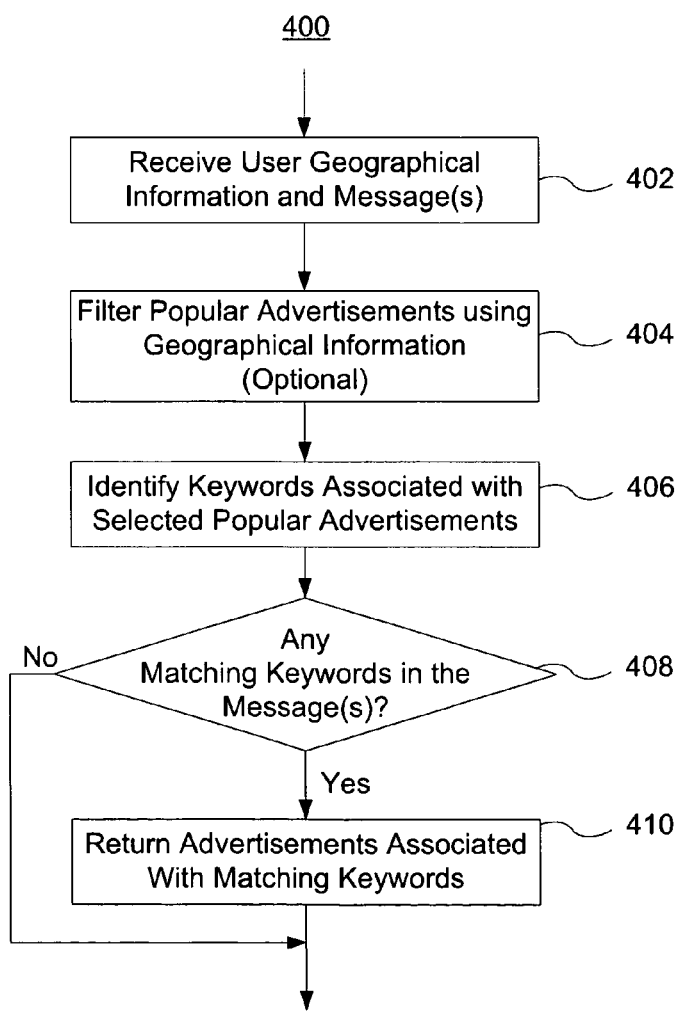
FIG. 4 is a flow diagram of a process of identifying popular advertisements for an electronic message requested by a user in accordance with some embodiments of the present invention.

FIG. 4 depicts an exemplary process of identifying popular advertisements for a requested electronic message in accordance with some embodiments of the present invention. In some embodiments, this process is performed by an advertisement server or information item server. In some embodiments, this process corresponds to operation 210 of the process shown in FIG. 2. Upon receipt of the user geographical information and the messages (402), the advertisement server applies the user geographical information to the candidate popular advertisements to filter out geo-targeted advertisements whose targeted geographical region does not include the user's current location (404). Alternately, if at least some of the advertisements include geography-specific CTR information, operation 404 may include filtering out advertisements whose CTR for the geographic region that includes the user's current location is below a predefined CTR threshold.

In some embodiments, if the user's current location is unknown, operation 404 is skipped. In some embodiments, geographic information is not used to select advertisements, in which case operation 404 is not part of the advertisement selection process. Other uses of the user geographical information can be found in the co-pending U.S. patent application entitled "System and Method for Targeting Advertisements or Other Information Using User Geographical Information," which is incorporated by reference herein in its entirety.

After selecting a group of popular advertisements, the process identifies a set of keywords associated with the group of advertisements (406). Next, the process determines whether any of the keywords are found in the message (408). If a keyword has a match in the message (408, Yes), an advertisement associated with the keyword are returned to the information service (410). If there is more than one advertisement associated with the same keyword, one or more of the advertisements (from the set of advertisements associated with the keyword found in the message) having the highest CTR are selected and returned to the information server. In some embodiments, the CTR used for selecting the most popular advertisements whose keyword(s) are found in the message is the most geographically specific CTR for each advertisement that is consistent with the user's current location. Thus, if an advertisement includes an overall CTR, a national CTR and a state CTR, all of which are applicable to the user's current location, the state CTR would be used.

If multiple keywords are found in the message, a predefined selection process may be used to determine which advertisements associated with those keywords are returned to the information service. For example, a round robin selection process may be used, in which the highest CTR advertisement (among the not-yet selected advertisements) for each matching keyword is selected, until a predefined maximum number of advertisements have been selected. Alternately, a relevancy metric may be computed for each candidate advertisement, and then the advertisements with the best (e.g., highest) relevancy metric are selected for return to the information service. The relevancy metric of an advertisement may be based on a number of factors, including one or more of the following factors: the number of keywords associated with the advertisement found in the message, the number of matching keywords in the message, the advertisement's click-through rate, the number of times the advertisement has previously been displayed to the user, whether the user has previously seen and clicked through the advertisement, and possibly other factors as well. In some embodiments, information corresponding to the relevancy metrics of the selected advertisements may be provided along with the selected advertisements, for use in determining the positioning or display order of the selected advertisements.

The order of operations in the process of identifying popular advertisements may differ in some embodiments. For instance, in some embodiments, filtering based on geo-targeting may be performed after using keyword matching to identify candidate advertisements. Thus, after identifying matching keywords, a set of candidate advertisements associated with the matching keywords is identified, and that set is then optionally filtered based on geo-targeting so as to produce a filtered set of candidate advertisements. Selection of advertisements from the filtered set can be based on a popularity metric, as described above. Furthermore, in some embodiments, the operations of geo-target filtering and selection of advertisements based on a popularity metric may be combined into a single operation (i.e., performed together instead of performed in sequence).

The processes described above with reference to FIGS. 3 and 4 may be performed to select popular information items as well as, or instead of, popular advertisements.

Note that the processes of FIGS. 3 and 4 are independent from each other. The process of FIG. 3 is performed periodically so as to refresh the set of popular advertisements and their associated keywords. The process of FIG. 4 is performed in response to requests for targeted information.

Figure 5:
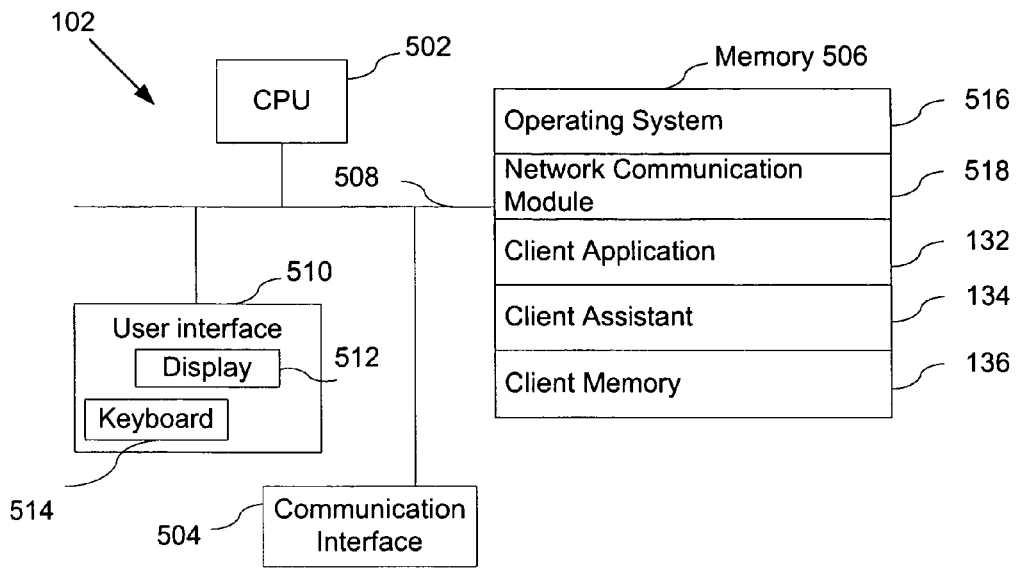
FIG. 5 is a block diagram of an exemplary client in accordance with some embodiments of the present invention.

FIG. 5 is a block diagram illustrating a client 102 in accordance with one embodiment of the present invention. The client 102 typically includes one or more processing units (CPUs) 902, one or more network or other communications interfaces 504, memory 506, and one or more communication buses 508 for interconnecting these components. The client 102 optionally may include a user interface 510 comprising a display device 512 and a keyboard 514. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. In some embodiments, memory 506 stores the following programs, modules and data structures, or a subset thereof:

- an operating system 516 that includes procedures for handling various basic system services and for performing hardware dependent tasks;
- a network communication module 518 that is used for connecting the client 102 to other computers via the one or more communication network interfaces 504 and one or more communication networks, such as the Internet, other wide area networks, local area networks, metropolitan area networks, and so on;
- a client application 132 that can permit a user to interact with the client 102 as described above;
- a client assistant 134 that can perform one or more tasks as described above; and
- a client memory 136 that can optionally include various data structures used by the client application 132 and the client assistant 134.

Figure 6:
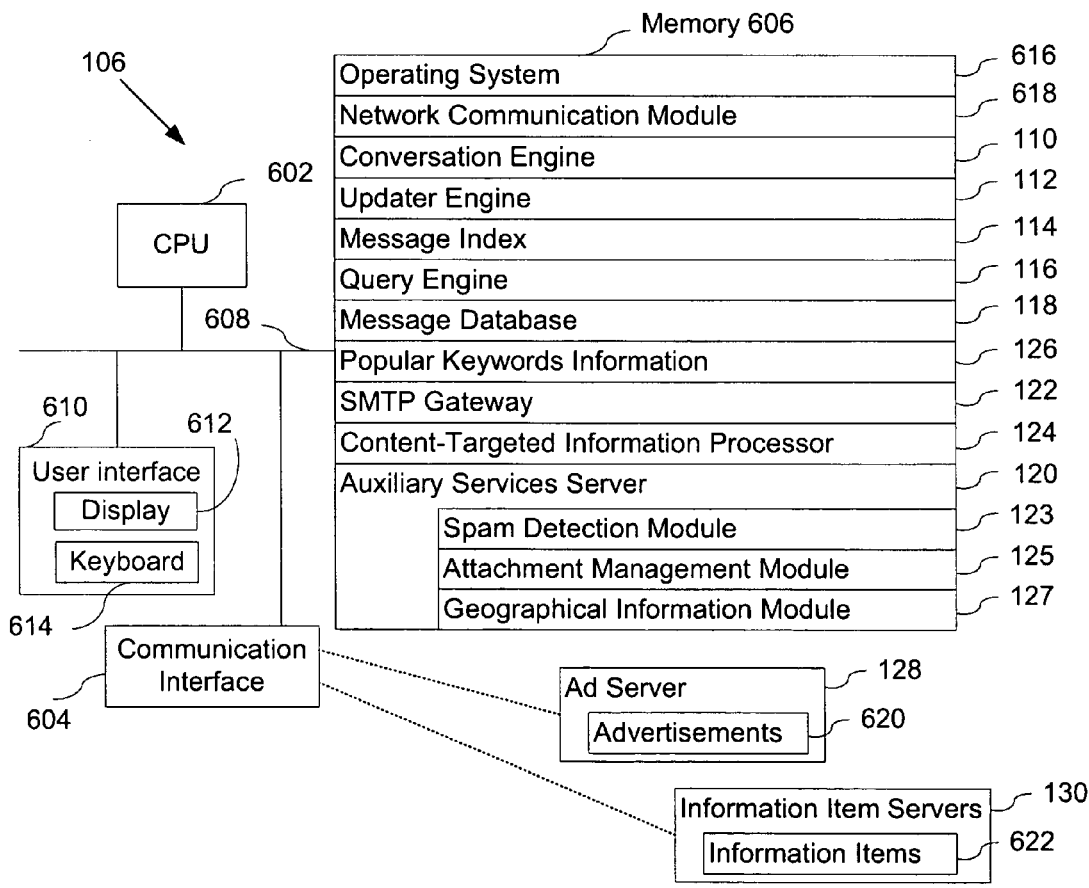
FIG. 6 is a block diagram of an exemplary information server in accordance with some embodiments of the present invention.

FIG. 6 is a block diagram illustrating an information service 106 in accordance with one embodiment of the present invention. The information service 106 typically includes one or more processing units (CPUs) 602, one or more network or other communications interfaces 604, memory 606, and one or more communication buses 608 for interconnecting these components. The information service 106 optionally may include a user interface 610 comprising a display device 612 and a keyboard 614. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:

- an operating system 616 that includes procedures for handling various basic system services and for performing hardware dependent tasks;
- a network communication module 618 that is used for connecting the information service 106 to other computers via the one or more communication network interfaces 604 and one or more communication networks, such as the Internet, other wide area networks, local area networks, metropolitan area networks, and so on;
- a targeted information processor 124 for obtaining targeted information for one or more identified messages as described above; and
- popular keywords information 126 that can include data structures hosting keywords associated with popular information items, examples of which are described above.

In some embodiments, the information service 106 includes the following elements, or a subset or superset of such elements: a conversation engine 110 for responding to a variety of requests from the client assistant 134 returning conversation-based responses; an updater engine 112 for updating a message database 118; a message index 114 containing index information for messages in the message database 118; a query engine 116 for performing various queries using the message index 114 and message database 118; an SMTP gateway 122 for sending and receiving messages; an auxiliary services server 120 for performing various auxiliary services; and an IP-Geo mapping database 127 for generating user geographical information.

The information service 106 can be connected to advertisement server 128 and/or information item server 130 via the communication interface 604. Advertisement server 128 can contain one or more advertisements 620. The advertisement server 128 can receive input and return advertisements that can be relevant to the input. The information item server 130 can include one or more information items 622. Similar to the advertisement server 128, the information server 130 can receive input and return informational items that can be relevant to the input.

Each of the above identified elements in FIGS. 5 and 6 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 or 606 may store a subset of the modules and data structures identified above. Furthermore, memory 506 or 606 may store additional modules and data structures not described above.

Although FIGS. 5 and 6 show respectively a client 102 and an information service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement an information service 106 and how features are allocated among them will vary from one implementation to another, and may depend in part on the amount of data traffic that the system must handle during peak usage periods as well as during average usage periods. For example, the service of converting an IP address into user geographical information can be delegated to a third-party server to which the information service 106 has a connection through the communication with the communication interface 604.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of selecting information items in connection with electronic messages selected from a group consisting of one or more of email messages, IM messages, transcribed voice messages, SMS messages, and any combination thereof, comprising:

on a server system having one or more processors that execute one or more programs stored in a memory of the server system:
receiving a request from a client device for a conversation, the conversation including a plurality of electronic messages;

responding to the request for the conversation, including:
selecting an electronic message, from the plurality of electronic messages in the conversation, in accordance with one or more selection criteria;
selecting a plurality of information items based on user geographical information obtained from the request and based on a measure of popularity of the information items among a respective group of users that includes a user of the client device, each of the plurality of information items having an associated keyword, the respective group of users comprising one of a plurality of distinct groups of users for which the server system has access to popularity information for respective information items, wherein the plurality of distinct groups of users are defined in accordance with a communication channel through which the information items are sent to a group of users in the plurality of groups of users;
identifying one or more of the selected information items whose associated keyword is found in the selected electronic message; and
sending to the client device the one or more identified information items and the conversation.

2. The method of claim 1, wherein the user geographical information is derived from an IP address of the client device.

3. The method of claim 1, wherein at least one of the information items is an item specifically targeting users located in a region corresponding to the user geographical information.

4. The method of claim 1, wherein at least one of the information items is selected if the information item targets users located in a region corresponding to the user geographical information.

5. The method of claim 1, wherein at least one of the information items is selected in accordance with click-through rate information for users located in a region corresponding to the user geographical information.

6. The method of claim 1, wherein the information items include at least one advertisement.

7. The method of claim 1, wherein the identifying one or more of the selected information items is further based on a relevancy metric quantifying relevancy of the information items to the selected electronic message.

8. The method of claim 1, wherein the plurality of information items are selected from a set of candidate information items, and the measure of popularity of the information items corresponds to values of a popularity metric associated with the candidate information items.

9. The method of claim 8, wherein the popularity metric for each of the candidate items is a cumulative click-through rate for the item during a predefined time period.

10. The method of claim 8, wherein the popularity metric for each of the candidate items is based on a set of geography-specific click-through rates for the item during a predefined time period.

11. The method of claim 10, wherein the information items are selected if one of the geography-specific click-through rates for the item, corresponding to user geographical information associated with a user accessing the selected electronic message from a client device, is above a predefined threshold.

12. A server system for serving information items to a user in connection with an electronic message selected from a group consisting of one or more of email messages, IM messages, transcribed voice messages, SMS messages, and any combination thereof, comprising:
a memory;
one or more processors; and
at least one program, stored in the memory and executed by the one or more processors, the at least one program further including instructions for:
receiving from a client device a request for a conversation, the conversation including a plurality of messages;
responding to the request for the conversation, including:
selecting an electronic message, from the plurality of electronic messages in the conversation, in accordance with one or more selection criteria;
selecting a plurality of information items based on user geographical information obtained from the request and based on a measure of popularity of the information items among a respective group of users that includes a user of the client device, each of the plurality of information items having an associated keyword, the respective group of users comprising one of a plurality of distinct groups of users for which the server system has access to popularity information for respective information items, wherein the plurality of distinct groups of users are defined in accordance with a communication channel through which the information items are sent to a group of users in the plurality of groups of users;
identifying one or more of the selected information items whose associated keyword is found in the selected electronic message; and
sending to the client device the one or more identified information items and the conversation.

13. The server system of claim 12, wherein at least one of the information items is an item specifically targeting users located in a region corresponding to the user geographical information.

14. The server system of claim 12, wherein at least one of the information items is selected in accordance with click-through rate information for users located in a region corresponding to the user geographical information.

15. The server system of claim 12, wherein the plurality of information items are selected from a set of candidate information items, and the measure of popularity of the information items corresponds to values of a popularity metric associated with the candidate information items.

16. The server system of claim 15, wherein the popularity metric for each of the candidate items is a cumulative click-through rate for the item during a predefined time period.

17. The server system of claim 15, wherein the popularity metric for each of the candidate items is based on a set of geography-specific click-through rates for the item during a predefined time period.

18. A non-transitory computer readable storage medium storing one or more programs, the one or more programs for serving information items to a user in connection with an electronic message selected from a group consisting of one or more of email messages, IM messages, transcribed voice messages, SMS messages, and any combination thereof, the one or more programs comprising instructions, which when executed by a server system, cause the server system to:
receive a request from a client device for a conversation, the conversation including a plurality of messages;
respond to a request for the conversation, including:

selecting an electronic message, from the plurality of electronic messages in the conversation, in accordance with one or more selection criteria;

selecting a plurality of information items based on user geographical information obtained from the request and based on a measure of popularity of the information items among a respective group of users that includes a user of the client device, each of the plurality of information items having an associated keyword, the respective group of users comprising one of a plurality of distinct groups of users for which the server system has access to popularity information for respective information items, wherein the plurality of distinct groups of users are defined in accordance with a communication channel through which the information items are sent to a group of users in the plurality of groups of users;

identifying one or more of the selected information items whose associated keyword is found in the selected electronic message; and sending to the client device the one or more identified information items and the conversation.

19. The non-transitory computer readable storage medium of claim 18, wherein at least one of the information items is an item specifically targeting users located in a region corresponding to the user geographical information.

20. The non-transitory computer readable storage medium of claim 18, wherein at least one of the information items is selected in accordance with click-through rate information for users located in a region corresponding to the user geographical information.

21. The non-transitory computer readable storage medium of claim 18, wherein the plurality of information items are selected from a set of candidate information items, and the measure of popularity of the information items corresponds to values of a popularity metric associated with the candidate information items.

22. The non-transitory computer readable storage medium of claim 21, wherein the popularity metric for each of the candidate items is a cumulative click-through rate for the item during a predefined time period.

23. The non-transitory computer readable storage medium of claim 21, wherein the popularity metric for each of the candidate items is based on a set of geography-specific click-through rates for the item during a predefined time period.

24. A computer-implemented method of selecting information items in connection with an electronic message selected from a group consisting of one or more of email messages, IM messages, transcribed voice messages, SMS messages, and any combination thereof, comprising:

on a server system having one or more processors that execute one or more programs stored in a memory of the server system:

receiving a request from a client for a conversation, the conversation including a plurality of messages;

responding to the request for the conversation, including:

selecting an electronic message, from the plurality of electronic messages in the conversation, in accordance with one or more selection criteria;

conducting semantic analysis on the selected electronic message;

extracting one or more concepts from the selected electronic message based on the semantic analysis;

selecting a plurality of information items based on user geographical information obtained from the request and based on a measure of popularity of the information items among a respective group of users that includes a user of the client device, each of the plurality of information items having an associated keyword relevant to the one or more concepts, the respective group of users comprising one of a plurality of distinct groups of users for which the server system has access to popularity information for respective information items, wherein the plurality of distinct groups of users are defined in accordance with a communication channel through which the information items are sent to a group of users in the plurality of groups of users;

identifying one or more of the selected information items whose associated keyword is relevant to the one or more concepts extracted from the selected electronic message; and sending to the client device the one or more identified information items and the conversation.

25. The method of claim 24, wherein the user geographical information is derived from an IP address of the client device.

26. The method of claim 24, wherein the plurality of information items are selected from a set of candidate information items, and the measure of popularity of the information items corresponds to values of a popularity metric associated with the candidate information items.

27. The method of claim 26, wherein the popularity metric for each of the candidate items is based on a set of geography-specific click-through rates for the item during a predefined time period.

28. A server system for serving information items to a user in connection with an electronic message selected from a group consisting of one or more of email messages, IM messages, transcribed voice messages, SMS messages, and any combination thereof, comprising:

a memory;

one or more processors; and at least one program, stored in the memory and executed by the one or more processors, the at least one program further including instructions for:

receiving a request from a client device for a conversation, the conversation including a plurality of messages;

responding to the request for the conversation, including:

selecting an electronic message, from the plurality of electronic messages in the conversation, in accordance with one or more selection criteria;

conducting semantic analysis on the selected electronic message;

extracting one or more concepts from the selected electronic message based on the semantic analysis;

selecting a plurality of information items based on user geographical information obtained from the request and based on a measure of popularity of the information items among a respective group of users that includes a user of the client device, each of the plurality of information items having an associated keyword relevant to the one or more concepts, the respective group of users comprising one of a plurality of distinct groups of users for which the server system has access to popularity information for respective information items, wherein the plurality of distinct groups of users are defined in accordance with a communication channel through which the information items are sent to a group of users in the plurality of groups of users;

identifying one or more of the selected information items whose associated keyword is relevant to the one or more concepts extracted from the selected electronic message; and sending to the client device the one or more identified information items and the conversation.

29. The server system of claim 28, wherein the user geographical information is derived from an IP address of the client device.

30. The server system of claim 28, wherein the plurality of information items are selected from a set of candidate information items, and the measure of popularity of the information items corresponds to values of a popularity metric associated with the candidate information items.

31. The server system of claim 30, wherein the popularity metric for each of the candidate items is based on a set of geography-specific click-through rates for the item during a predefined time period.

32. A non-transitory computer readable storage medium storing one or more programs, the one or more programs for serving information items to a user in connection with an electronic message selected from a group consisting of one or more email messages, IM messages, transcribed voice messages, SMS messages, and any combination thereof, the one or more programs which when executed by a server system, cause the server system to:

receive a request from a client device for a conversation, the conversation including a plurality of messages;

respond to the request for the conversation, including:

selecting an electronic message, from the plurality of electronic messages in the conversation, in accordance with one or more selection criteria;

conducting semantic analysis on the selected electronic message;

extracting one or more concepts from the selected electronic message based on the semantic analysis;

selecting a plurality of information items based on user geographical information obtained from the request and based on a measure of popularity of the information items among a respective group of users that includes a user of the client device, each of the plurality of information items having an associated keyword relevant to the one or more concepts, the respective group of users comprising one of a plurality of distinct groups of users for which the server system has access to popularity information for respective information items, wherein the plurality of distinct groups of users are defined in accordance with a communication channel through which the information items are sent to a group of users in the plurality of groups of users;

identifying one or more of the selected information items whose associated keyword is relevant to the one or more concepts extracted from the selected electronic message; and sending to the client device the one or more identified information items and the conversation.

33. The non-transitory computer readable storage medium of claim 32, wherein the user geographical information is derived from an IP address of the client device.

34. The non-transitory computer readable storage medium of claim 32, wherein the plurality of information items are selected from a set of candidate information items, and the measure of popularity of the information items corresponds to values of a popularity metric associated with the candidate information items.

35. The non-transitory computer readable storage medium of claim 34, wherein the popularity metric for each of the candidate items is based on a set of geography-specific click-through rates for the item during a predefined time period.

* * * * *